No. 634,803. Patented Oct. 10, 1899.
J. H. CHASE.
ADJUSTABLE CASTER.
(Application filed Feb. 18, 1899.)

(No Model.)

WITNESSES
Percy G. Bolster
John T. Roche

INVENTOR
Joseph Herbert Chase,
Per Edwin W. Brown,
Attorney.

UNITED STATES PATENT OFFICE.

JOSEPH HERBERT CHASE, OF MERIDEN, CONNECTICUT, ASSIGNOR TO THE AEOLIAN COMPANY, OF SAME PLACE.

ADJUSTABLE CASTER.

SPECIFICATION forming part of Letters Patent No. 634,803, dated October 10, 1899.

Application filed February 18, 1899. Serial No. 705,989. (No model.)

*To all whom it may concern:*

Be it known that I, JOSEPH HERBERT CHASE, of Meriden, in the county of New Haven and State of Connecticut, have invented certain new and useful Improvements in Adjustable Casters, of which the following is a full, clear, and exact description.

The object of this invention is to provide a caster for furniture or other article which, while it serves the purpose of a caster, can be easily and conveniently so adjusted in itself on the furniture or other article to which it is applied that the height from the floor or other support of the furniture or other article can be regulated as desired; and the invention consists of an adjustable caster provided with means upon the inner end of the caster-spindle for engaging the end of a screw-threaded sleeve, whereby adjustment is obtained, said spindle and sleeves being normally out of engagement, which allows the caster to rotate freely without disturbing the adjustment, all substantially as hereinafter fully described, reference being had to the accompanying sheet of drawings, in which is illustrated a caster for furniture, &c., constructed and arranged for operation in accordance with this invention.

Figure 1:
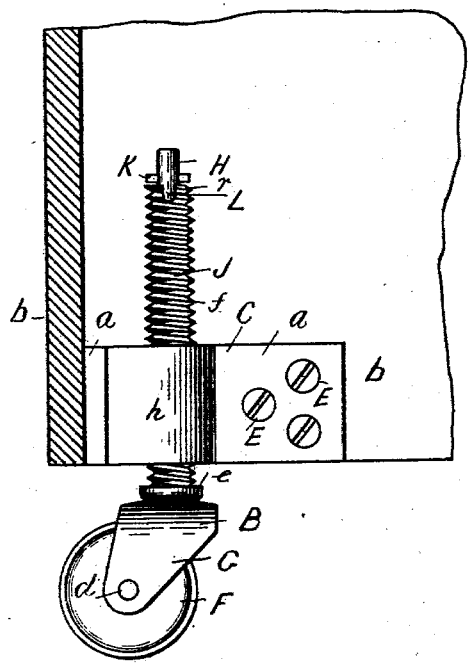
Figure 2:
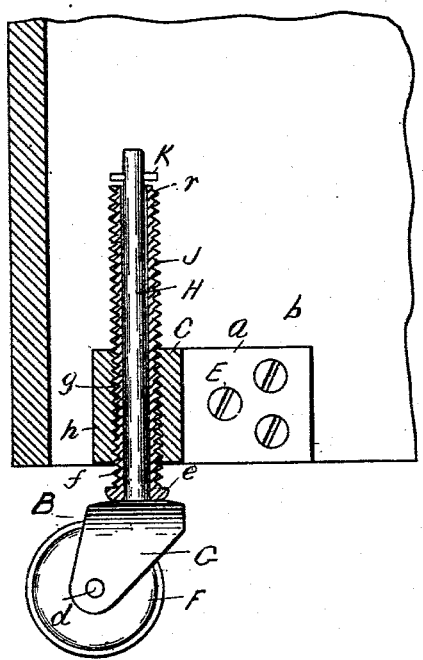
Figures 3, 4:
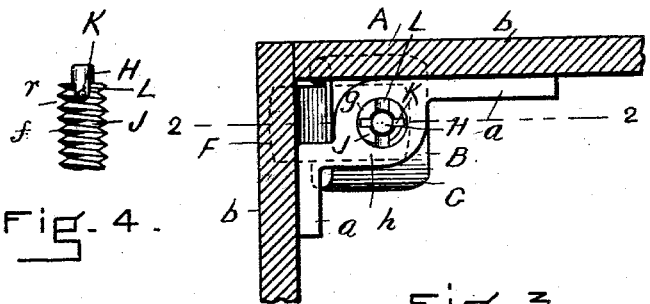
Figure 5:
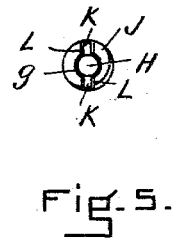

Figure 1 is an inner side view of the caster as applied to one corner of a case or other article which is shown in section in detail. Fig. 2 is a central vertical section on line 2 2, Fig. 3, of the caster and the case. Fig. 3 is a detail cross-section of the corner of the case with the caster in plan view. Fig. 4 is a detail side view of the upper end of the caster. Fig. 5 is a detail plan view of the upper end of the caster.

In the drawings, A represents a corner of a case or other article of furniture to which the caster B is applied.

C is the holder or support of the caster, consisting of a right-angular piece having screw-holes through each arm $a$, by which it is secured in place by screws E to the two inner sides $b$ of the case at the corner, one at each corner. This holder can be constructed of any suitable shape or form, according to the case or other article to which the caster is to be applied.

The caster consists of a wheel or roll F, pivoted at $d$ in the forked arms G, provided with a spindle or stem H in the usual manner of casters, except as to the present invention.

The spindle or stem H of the caster is longer than the usual spindle of a caster, and it is disposed in a tube or sleeve J, in which it can freely rotate and move up and down, the caster bearing by its forked arms against a head $e$ of the sleeve. This tube or sleeve has an external screw-thread $f$, preferably endless, and is arranged to screw up through a hole $g$ in the central portion $h$ of the angular holder C, such portion being made somewhat thicker for the reception of the sleeve. The spindle or stem is of a length to extend beyond or above the upper end $r$ of the sleeve, in which end is a transverse pin K, as shown, and in the upper end of the sleeve is a transverse groove or slot L, with which, when the furniture or other article to which the caster is applied is raised from the floor or its support, the cross-pin of the caster as the caster drops down will drop into and engage, as shown in Figs. 4 and 5; but when the caster is resting on the floor or other support the pin K is above and free of the sleeve, as shown in Figs. 1 and 2, allowing the caster-stem to freely turn therein in its use.

When the caster by its stem is engaged with the sleeve, turning the caster by hand to the right or left will turn the sleeve correspondingly in its holder and by its screw-thread raise or lower it in its holder, so that if then the furniture is again placed upon the floor or support it will be higher from or lower or nearer to the floor, according as the sleeve is turned more or less in its holder. Thus by adjusting the sleeve longitudinally in its holder in the manner described it will be raised or lowered accordingly, as desired, by which the article of furniture can be adjusted to varying heights from the floor, limited only to the lengths of the caster-stem and sleeve. At the same time when the furniture is down for the use of the caster the caster can freely turn and operate as usual.

The sleeve can be arranged to be moved in its holder in other ways than as herein described and independently of the caster-stem, if desired, although the present arrangement is simple, very practical, and useful.

Having thus described my invention, what I claim is—

1. In a caster, the combination of a holder or support, a sleeve screwed therein, and extending therethrough, the stem or spindle of the caster disposed in said sleeve and extended therethrough, and means at the inner end of the sleeve and stem for locking the stem to the sleeve and allowing adjustment of the sleeve in its holder, substantially as specified.

2. In a caster, the combination of a holder or support, a tube or sleeve screwed therein, the stem or spindle of the caster disposed in said tube or sleeve and extended therethrough, said stem or spindle being normally free to rotate in said sleeve without disturbing its adjustment, and means upon the inner ends of said sleeve and spindle for adjusting said sleeve in its holder, substantially as described.

3. In a caster for furniture or other article, in combination, a holder or support, a tube or sleeve secured to and adapted to be adjusted longitudinally therein, a transverse slot or groove in one end of the sleeve, the stem or spindle of the caster disposed in the sleeve, a cross-pin in the end of the stem or spindle adapted to engage with the slot or groove of the sleeve.

4. In a caster for furniture or other article, in combination, a holder or support, a tube or sleeve screwed therein by which it can be adjusted longitudinally, a transverse slot or groove in one end of the sleeve, the stem or spindle of the caster disposed in the sleeve, a cross-pin in the end of the stem or spindle to engage with the slot or groove of the sleeve.

5. In a caster for furniture or other article, in combination, a holder or support, a tube or sleeve adjustable therein, the stem or spindle of the caster disposed in the tube or sleeve and extended therethrough and endwise movable to lock or unlock it from the sleeve, and means on the end of the spindle for engaging the end of the tube or sleeve for locking the stem to the tube, as and for the purpose specified.

In testimony whereof I have hereunto set my hand in the presence of two subscribing witnesses.

JOSEPH HERBERT CHASE.

Witnesses:
W. K. BRIGHAM,
A. C. BUMPUS.